(12) United States Patent
Zhang et al.

(10) Patent No.: US 12,230,999 B2
(45) Date of Patent: Feb. 18, 2025

(54) AUXILIARY ARRANGEMENT FOR A LED TUBE LAMP

(71) Applicant: SIGNIFY HOLDING B.V., Eindhoven (NL)

(72) Inventors: Hui Zhang, Shanghai (CN); Zhaomin Meng, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/279,943

(22) PCT Filed: Feb. 22, 2022

(86) PCT No.: PCT/EP2022/054338
§ 371 (c)(1),
(2) Date: Sep. 1, 2023

(87) PCT Pub. No.: WO2022/189134
PCT Pub. Date: Sep. 15, 2022

(65) Prior Publication Data
US 2024/0154456 A1     May 9, 2024

(30) Foreign Application Priority Data

Mar. 9, 2021 (WO) ................ PCT/CN2021/079827
Jul. 12, 2021 (EP) .................................... 21185086

(51) Int. Cl.
*H02J 9/06* (2006.01)
*H05B 45/3578* (2020.01)

(52) U.S. Cl.
CPC .......... *H02J 9/065* (2013.01); *H05B 45/3578* (2020.01)

(58) Field of Classification Search
None
See application file for complete search history.

(56) References Cited

U.S. PATENT DOCUMENTS

| 6,502,044 | B1* | 12/2002 | Lane ....................... H02J 9/005 363/101 |
| 2013/0147351 | A1* | 6/2013 | Trainor .................. H05B 45/10 315/86 |
| 2014/0361623 | A1 | 12/2014 | Siessegger et al. |
| 2016/0286621 | A1 | 9/2016 | Tao et al. |
| 2017/0079111 | A1 | 3/2017 | Rezeanu et al. |
| 2019/0032864 | A1* | 1/2019 | Xiong ................... F21V 23/005 |
| 2019/0346088 | A1 | 11/2019 | Xiong et al. |

FOREIGN PATENT DOCUMENTS

| DE | 102013108775 A1 | 2/2015 |
| EP | 0939476 A2 | 9/1999 |
| EP | 0939476 A3 | 12/2000 |
| WO | 2020194355 A1 | 10/2020 |

* cited by examiner

*Primary Examiner* — Anh Q Tran (57) ABSTRACT

An approach for providing an auxiliary arrangement for a LED tube lamp that adapts a DC voltage for a monitoring circuit of the LED tube lamp. In particular, a modulation circuit of the auxiliary arrangement modulates a DC supply voltage, for the LED tube lamp, to simulate one or more characteristics of an alternating mains supply voltage for which the LED tube lamp is adapted. Preferably the at least one electrical characteristic comprises one or more electrical characteristics configured to designed to be detected by a monitoring circuit of the LED tube lamp operating in a safety detection mode, to allow the monitoring circuit to start a safety detection using the DC supply voltage.

15 Claims, 3 Drawing Sheets

AUXILIARY ARRANGEMENT FOR A LED TUBE LAMP

CROSS-REFERENCE TO PRIOR APPLICATIONS

This application is the U.S. National Phase application under 35 U.S.C. § 371 of International Application No. PCT/EP2022/054338, filed on Feb. 22, 2022, which claims the benefit of European Patent Application No. 21185086.2, filed on Jul. 12, 2021 and International Application No. PCT/CN2021/079827, filed on Mar. 9, 2021. These applications are hereby incorporated by reference herein.

FIELD OF THE INVENTION

The present invention relates to the field of LED tube lamps, and in particular, to auxiliary sources of power for LED tube lamps.

BACKGROUND OF THE INVENTION

In the field of lighting, there has been a growing interest in LED lighting units for replacing or retrofitting older lighting units, and in particular fluorescent tube lamps. Such LED lighting units are commonly referred to as "LED tube lamps". These retrofit LED lighting units need to be appropriately designed so that they are able to draw power from a power source such as a ballast that was originally designed for powering a fluorescent lamp. This LED lamp is called as "Type A" lamp indicating that it is compatible with the ballast.

As the market grows, there is also a business for new installations where there is no ballast or for re-wired installations wherein the ballast was bypassed/removed. Thus the LED tube lamp directly connects to AC mains supply, and this is called as a "Type B" lamp, in other words the supply of the lamp is a power source that comprises at least the AC mains supply, but does not comprise at least one component of a ballast. For instance, one or more components of the ballast (if ever present), such as the igniter, EM ballast and/or compensation capacitor may have been removed, deactivated or bypassed. In embodiments, the "Type B" power source may comprise only the AC mains supply.

It would be desirable for an LED tube lamp to remain active (e.g. output light) even if an AC main supply is disconnected or absent or has otherwise failed, namely in an emergency situation, or a demand on request situation wherein the user would like to switch from AC mains supply to another power source to avoid an over-use of AC mains supply at peak hour. Thus, it would be preferable to have a back-up or auxiliary source of power for the LED tube lamp. Typically, an auxiliary source of power includes a battery or cell arrangement that is configured to provide a DC voltage to power the LED tube lamp, optionally there is a converter to convert the DC voltage of the battery into a lower or higher voltage/current that is suitable for the LED tube lamp. This concept of DC emergency for AC LED tube lamp is known.

There is an ongoing desire to ensure the operation of the back-up or auxiliary source of power for the LED tube lamp is performed effectively, promptly and/or with a low risk of failure.

WO2020194355A1 discloses that an emergency lamp is able to receive the optical commands in order to carry out operational and/or configuration mode tests.

EP0939476A2 discloses an emergency lighting supply wherein the voltage shape applied to the end circuits can be altered and individual standby lights are associated with switching units with devices for detecting the voltage shape a switching on or off the associated standby lights accordingly.

SUMMARY OF THE INVENTION

A problem of the conventional type B LED tube lamps is that they often contain a monitoring circuit configured to perform safety detections or checks on whether an AC mains power supplied/connected to the LED tube lamp correctly, e.g. to check that a human body/subject isn't touching one input end to the LED tube lamp while another input end of the lamp is already in an active lamp socket, forming an impedance between the AC mains power and the LED lamp, before allowing current to flow through the LED tube lamp. Such a safety detection is disclosed in DE102013108775. However, these monitoring circuit often rely upon certain characteristics of an AC mains in order to function correctly, e.g. to trigger the start of the safety detection or trigger certain steps within a safety detection upon the certain electrical characteristics of an AC mains. For example, some LED tube lamp does the safety detection at low voltage of the AC mains, near zero crossing, such that the voltage to the potential human body is at low level thus safe. The electrical characteristic could also be construed in terms of a characteristic of the waveform of an AC mains voltage, in time domain, frequency domain, etc.

The inventors have an insight that a DC supply, replacing the AC mains in the event of a failure of the AC mains (namely, emergency) or absence of the AC mains, is unlikely to have these same electrical characteristics since the output voltage of the DC supply is often a constant DC voltage with a very small ripple of 1%. Accordingly, some LED tube lamps may not operate correctly in the event of a kick in of the DC supply, as the safety detection would not be triggered to start by the DC voltage of the DC supply, let alone the safety to be passed, thereby preventing power being drawn by the LED tube of the LED tube lamp and the LED tube lamp would not remain active as desired.

The present disclosure proposes an approach to overcoming this problem, by appropriately modulating a DC voltage supplied to the LED tube lamp with the same characteristics, so that the DC voltage simulates or emulates the AC mains, as seen by the triggering circuit of the LED tube lamp, in terms of triggering the start of the safety detection.

The invention is defined by the claims.

According to examples in accordance with an aspect of the invention, there is provided an auxiliary arrangement for providing a DC supply voltage for driving an LED tube lamp in the absence, failure or disconnection of an alternating mains supply voltage for driving the LED tube lamp.

The auxiliary arrangement comprises: an input interface configured to receive, from a DC voltage supply, an input DC voltage generated by the DC voltage supply in the absence, failure or disconnection of the alternating mains supply; an output interface for connecting to the LED tube lamp and for providing the DC supply voltage to the connected LED tube lamp; characterized in that the auxiliary arrangement comprises: a modulation circuit connected between the input interface and the output interface, the modulation circuit being configured to modulate the input DC voltage according to one or more modulation patterns, wherein said one or more modulation patterns are configured to control the DC supply voltage at the output interface to have at least one electrical characteristic substantially the same as the alternating mains supply voltage, to thereby produce the DC supply voltage.

The present invention recognizes that a failure of an AC supply (for powering an LED tube lamp) can result in a DC supply being used as an auxiliary power source for the LED tube lamp. In particular, the DC supply is generally configured to provide a DC voltage, which is electrically eligible for powering the LED tube lamp as the DC voltage can pass the rectifier bridge of the LED tube lamp and powering the driver circuit of the LED tube lamp.

However, it is also herein recognized that modern LED tube lamps often contain monitoring circuitry configured to detect or identify correct operation or connection of an AC supply (e.g. detect a human body between the lamp and the neutral/ground). When there is a sudden or unexpected failure of the AC supply, there is usually a substantial time delay before a (emergency) DC voltage supply's kicks in. This results in an LED tube lamp temporarily losing power temporally, meaning that the LED tube lamp needs to re-detect the correct connection when the DC supply voltage is subsequently applied. The monitoring circuitry (of the LED tube lamp) is activated to do the detection at certain characteristics of the AC supply. In other words, the monitoring circuitry may only initiate "correct connection" detection if the supply has certain characteristics. Example characteristics include: a near zero crossing of AC supply, a high dv/dt point (meaning it is near zero crossing), or a low voltage of the AC supply. If the detection starts and passes, it will permit the LED tube lamp to operate (i.e. output light). It can be assumed that the LED tube lamp should inherently pass the detection when the DC supply kicks in, since the lamp will already be in the socket without human body. The LED tube lamp just needs to be activated/triggered to start the detection. There is therefore an underlying principle of and advantage to creating, in the DC supply voltage, the certain characteristics of the AC supply voltage.

It is herein proposed to use a modulation circuit to modulate a DC voltage (e.g. from an emergency or backup supply) in order to provide these characteristics of the AC supply voltage. This ensures that the DC supply is able to activate the monitoring circuitry, and then power and/or drive the LED tube lamp.

For the purposes of the present specification, the term "DC voltage" is used to refer to a voltage that only has one polarity. It will be appreciated that a DC voltage can be modulated to have even a zero returning or near-zero returning square-wave or saw-tooth like waveform whilst still being considered a "DC voltage" since its polarity is not reversed.

The one or more modulation patterns are preferably one or more predetermined modulation patterns.

In a detailed embodiment, the at least one electrical characteristic may comprise one or more electrical characteristics configured to be detected by a monitoring circuit of the LED tube lamp operating in a safety detection mode, to allow the monitoring circuit to start or carry out safety detection using the DC supply voltage.

This embodiment defines the function of the electrical characteristic modulated in the DC voltage is for being detected by the LED tube lamp to start the safety detection.

In an additional or alternative embodiment, the electrical characteristic is the criteria that the monitoring circuit judges that the connection is correct, namely the electrical characteristic is an electrical characteristic presented in the alternating mains supply when there is no human body is present.

One example of the electrical characteristic is a sufficiently high peak current flowing through the monitoring circuit, meaning there is no human body impedance under the alternating mains supply besides the monitoring circuit. Thus the modulation circuit can modulate this high current onto the DC supply voltage, by acting as a current source temporarily.

Optionally, the at least one electrical characteristic comprises at least one of: a voltage lower than both the amplitude of the input DC voltage and lower than a predetermined voltage; and/or a falling or rising edge with a slope having a gradient with a magnitude greater than a predetermined value. Preferably, the predetermined voltage is substantially lower than the unmodulated DC voltage, also lower than a ripple valley of the unmodulated DC voltage. The ripple of the unmodulated DC voltage is usually 1%. Alternatively, if the monitoring circuit of the LED tube lamp is triggered by any other electrical characteristic, that electrical characteristic could be modulated into the DC voltage, as long as the modulated DC voltage still belongs to the definition of "DC" voltage: a single polarity voltage.

Typical monitoring circuits are configured to start to detect a correct connection of an AC mains supply by recognizing at least one of these features of an input voltage to the LED tube lamp. By modifying a DC voltage (through appropriate modulation) to have one or more of these features, then the voltage supplied by the auxiliary arrangement can (at least initially) simulate the AC mains supply.

In some examples, the modulation circuit is adapted to modulate the DC voltage using with a sequence of two or more iterations of the one or more modulation patterns.

Some LED tube lamps require multiple instances of detections and turn on the driver if the results of the multiple instances of detection are all safe, thus this embodiment provides a sequence of multiple modulation patterns to trigger multiple instances of detections in the LED tube lamp. This provides a better compatibility with the LED tube lamp.

Repeating the modulation pattern also aids in providing redundancy, e.g. if a first iteration of a modulation pattern fails to trigger or pass the safety test (e.g. due to noise or the like).

Optionally the modulation patterns occur at a substantially same frequency at which the electrical characteristic occurs in the alternating mains supply voltage. This embodiment mimics the AC mains better. For example, if the electrical characteristic is a near-zero voltage, it could occur at a frequency of 100 or 120 Hz, mimicking the occurrence of near zero voltage in a rectified AC mains voltage. However, if the LED tube lamp does not have a strict timing requirement on the occurrence of the electrical characteristic, the modulation circuit can make the iterations as near as possible so as to make the LED tube lamp to complete the safety detection as soon as possible.

The modulation circuit may be adapted to sequentially perform one or more iterations of a first modulation pattern with one electrical characteristic; and one or more iterations of a second, different modulation pattern with another electrical characteristic different that of the first modulation pattern. The first modulation pattern may provide a DC supply voltage having an electrical characteristic and the second modulation pattern may provide a DC supply voltage having another electrical characteristic different from that of the first modulation pattern.

Thus, each modulation pattern may provide different types of electrical characteristic in the DC supply voltage.

Since the electrical characteristic to trigger the monitoring circuit may be different per different brand or model of the LED tube lamp, this embodiment would try multiple different electrical characteristics so as to give a broader compatibility with the different LED tube lamps.

Thus, the modulation circuit is configured to perform a sequence formed of at least two phases, a first phase including performance of one or more iterations of a first modulation pattern and a second phase including performance of one or more iterations of a second, different modulation pattern. Of course, the modulation circuit may be configured to perform a sequence formed of any number of phases (e.g. n-phases), wherein a different modulation pattern is performed one or more times during each phase.

The sequence may be repeated any number of times, e.g. repeated more than once.

In some examples, the auxiliary arrangement further comprises a power detector configured to detect when LED-driving power is drawn by the LED tube lamp, wherein the modulation circuit is configured to stop modulating the input DC voltage in response to the power detector detecting that LED-driving power is being drawn by the LED tube lamp.

It is recognized that once a monitoring circuit has performed the safety detection and allowed the LED tube lamp to draw power, that the monitoring circuit will not repeat the safety monitoring until a power reset/recycle. Thus, to improve an efficiency of the auxiliary arrangement and to provide a consistent power to the LED tube lamp, the auxiliary modulation circuit may stop modulating the converted voltage. Here LED-driving power means the power is for making the LED emit light, not the power for the peripheral circuits such as the monitoring circuit of the LED tube lamp. This power should preferably have a current higher than serval hundreds mA, e.g. greater than 300 mA or greater than 500 mA, while the current for operation of the peripheral circuits such as the monitoring circuit of the LED tube lamp is usually below 100 mA or 50 mA.

The modulation circuit may comprise a switch, in series or in parallel with the input interface or the output interface. The switch may be opened and closed to thereby modulate the DC voltage. The switch may work alternatively in a linear mode alone, or an alternation of a linear mode and open/close mode to modulate the DC voltage.

Optionally, the modulation circuit is adapted to make the DC supply voltage provide an electrical metric to be detected by the monitoring circuit to pass the safety detection using the DC supply voltage, after the safety detection of the monitoring circuit has started.

The auxiliary arrangement may be adapted to be connected between a DC-DC converter and the LED tube lamp. In particular, the input interface may be configured to connect to a DC-DC converter and the auxiliary arrangement may act as an add-on module between the DC-DC converter and the LED tube lamp. This provides a cheap add-on module without modifying/changing the DC-DC converter.

Alternatively, the auxiliary arrangement may comprise a DC-DC converter configured to modify a voltage level of the output DC voltage.

In this embodiment, the auxiliary arrangement is a DC backup driver as a whole to support type B LED tube lamp.

In some examples, the modulation circuit comprises the DC-DC converter, wherein the DC-DC converter is configured to vary its conversion operation to modulate the input DC voltage and add the at least one electrical characteristic to the DC supply voltage at the output interface of the auxiliary arrangement. In this embodiment, the DC-DC converter is re-used to generate the electrical characteristic, besides its original function of providing a substantially constant DC supply voltage to power the LED in the LED tube lamp. This gives a double function for the DC-DC converter in the backup driver.

The DC-DC converter may, for instance, adapted to work in an, optionally low frequency, burst mode to vary the input DC voltage so as to create the at least one electrical characteristic in the DC supply voltage.

This embodiment is relatively simple as making the DC-DC converter work in burst mode is easier than changing a frequency or duty cycle of the conversion. Besides, the electrical characteristic required by the Type B LED tube lamp is usually in low frequency domain, so making the DC-DC converter work in the low frequency burst mode is already sufficient. Here the "low" frequency is relative to the "high" frequency of the switching of the DC-DC converter which is a switch mode power supply (SMPS). The high frequency of switching of a SMPS can be in the range of tens of KHz to hundreds of KHz, while the low frequency of burst operation may be in the range of 10 Hz to 200 Hz.

The auxiliary arrangement may further comprise an AC status detection circuit adapted to receive an indication of an absence, failure or disconnection of the alternating mains supply voltage for driving the LED tube lamp, wherein the DC-DC converter is configured to only convert the input DC voltage in response to the AC status detection circuit receiving an indication of an absence, failure or disconnection of the alternating mains supply voltage. In case that the DC source is used in a demand on request where the AC mains is still present but the user wants to switch to the DC source, the AC status detection circuit would be replaced by an interface to receive an indication of the demand on request.

In this way, the auxiliary arrangement may be only configured to provide the DC supply voltage to the output interface in response to the AC status detection circuit indicating that there has been an absence, failure or disconnection of the alternating mains supply voltage for driving the LED tube lamp. This is a typical operation of an DC backup driver.

The auxiliary arrangement may further comprise a smoothing capacitor configured to at least partly smooth the DC supply voltage.

There is also proposed an backup driver comprising: the auxiliary arrangement previously described: and the DC voltage supply comprising: a supply input interface adapted to be connected to a backup energy storage; and a DC-DC conversion circuit adapted to convert energy from the backup energy storage, received at the driver input interface, to generate the DC voltage for the auxiliary arrangement. The backup driver may further include the backup energy storage, such as a battery or cell arrangement.

The backup driver may further comprise a supply AC status detection circuit adapted to receive an indication of an absence, failure or disconnection of the alternating mains supply voltage for driving the LED tube lamp, wherein the DC-DC conversion circuit is configured to only convert the energy from the backup energy storage in response to the supply AC status detection circuit receiving an indication of an absence, failure or disconnection of the alternating mains supply voltage. In case that the DC source is used in a demand on request where the AC mains is still present but the user wants to switch to the DC source, the AC status detection circuit would be replaced by an interface to receive an indication of the demand on request.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an approach for providing an auxiliary arrangement for a LED tube lamp that adapts a DC voltage for a monitoring circuit of the LED tube lamp which monitoring circuit is for safety detection in the LED tube lamp. In particular, a modulation circuit of the auxiliary arrangement modulates a DC supply voltage, for the LED tube lamp, to simulate one or more characteristics of an alternating mains supply voltage depending on which characteristics the LED tube lamp is adapted to start the safety detection.

The present disclosure relies upon a recognition that a monitoring circuit of the LED tube lamp relies upon certain characteristics of the alternating mains supply to perform a safety detection of a connected power source, and that these characteristics can be simulated or emulated in a (replacement) DC supply voltage through use of appropriate modulation. Though the DC supply voltage to the LED tube lamp is not completely the same as the AC mains signal, it has the characteristic to meet the requirement of the monitoring circuit.

Embodiments can be employed in any suitable lighting system, e.g. those employed in educational, healthcare, industrial, urban, outdoors or home environments.

Figure 1:
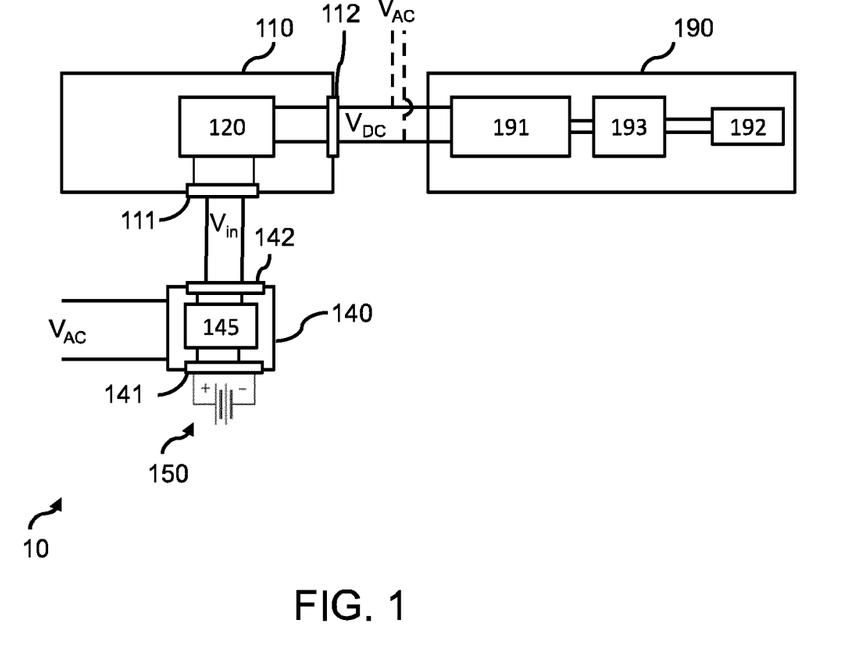
FIG. 1 illustrates a lighting unit having an auxiliary arrangement.

FIG. 1 is a block diagram illustrating a lighting unit 10 according to an embodiment. The lighting unit comprises an auxiliary arrangement 110, according to an embodiment, and a LED tube lamp 190.

The LED tube lamp 190 comprises a monitoring circuit 191 and an LED array 192. The LED array 192 may comprise one or more LEDs (not shown) configured to output light responsive to a current flowing through the LEDs.

The monitoring circuit 191, sometimes labelled "monitoring module", is configured to identify a correct operation or connection of an AC power supply $V_{AC}$ to the LED tube lamp 190 (e.g. detect the non-presence of a human or subject between the input to the LED tube lamp 190 and a ground/neutral voltage). In other words, the monitoring circuit 191 is configured to perform a "safety detection" to establish whether it is safe to operate the LED tube lamp (i.e. cause the LED tube lamp to draw power/current, which may otherwise flow through a potential human body and cause danger if the safety detection is not carried out). This may be performed by the monitoring circuit operating in a safety detection mode. If an incorrect operation/connection is detected, the monitoring circuit may prevent the flow of current through (downstream components of) the LED tube lamp 190 (and, in particular, through the LED array 192), i.e. to prevent the LED tube lamp from drawing (significant) power. If a correct operation/connection is detected, current is allowed to flow and the (downstream components of the) LED tube lamp is(/are) permitted to draw power.

A "correct" operation/connection may be one in which the input impedance is below some predetermined value (e.g. indicating that it is not likely that a human/object/subject is touching the input of the LED tube lamp). Conversely, an "incorrect" operation/connection may be one in which the input impedance is above some predetermined value. Other approaches to performing a safety detection for an LED tube lamp will be apparent to the skilled person.

The monitoring circuit 191 may be configured to perform this safety detection at the start of a power on, e.g. when power begins to be supplied to the LED tube lamp 190 (e.g. for a first time that power is provided to the LED tube lamp or after some period of time has elapsed since power has stopped being provided to the LED tube lamp). Thereafter, the monitoring circuit 191 may (e.g. until this power is removed) allow or disallow current flow.

In some examples, the monitoring circuit 191 may perform the safety detection in response to a trigger (e.g. in the AC mains power supplied to the LED tube lamp, such as certain electrical characteristics of the AC mains being met). If the safety detection is passed, the monitoring circuit may allow current flow (e.g. allow the LED tube lamp to draw power). If the safety detection is not passed, the monitoring circuit may continue to await a further trigger to repeat the safety detection.

Thus, the monitoring circuit 191 may monitor for, and be responsive to, the above trigger, which is a certain characteristic or characteristics in an AC mains power supplied to the LED tube lamp. This characteristic or characteristics may be used as a trigger to initiate the safety detection or a trigger that is used during the safety detection to trigger the measure of a metric during the safety detection, where a series of one or more triggers are used throughout the safety detection.

In some examples, upon detection of one or more certain characteristics, the monitoring circuit 191 performs (e.g. triggers the initiation of) the safety detection so as to determine whether or not to allow power to flow to the rest of the LED tube lamp 190.

In some examples, the safety detection performed by the monitoring circuit includes one or more steps that responds to certain one or more characteristics of a voltage supply (to the LED tube lamp), so that performance of the safety detection relies upon the presence of these certain characteristics.

In alternative examples, the safety detection performed by the monitoring circuit includes one or more steps of monitoring or obtaining metrics of certain characteristics of the voltage supply (e.g. an input current) to decide whether it is safe to operate the LED tube lamp.

The precise operation of these safety detections, and the required electrical characteristics of a voltage supply to trigger/pass the safety detection, differs depending upon the implementation details of the LED tube lamp. Some further examples will be given later in this description.

The LED tube lamp may further comprise a switched-mode power supply 193, e.g. comprising a DC-DC converter such as a buck, boost or buck-boost converter, configured to convert a voltage provided to the LED tube lamp into a voltage for driving the LED array 192. The converter 193, may, for instance, further comprise a rectifier (e.g. a bridge rectifier) for rectifying the AC full wave signal into DC half wave prior to inputting the DC voltage to the buck converter. Of course, if the converter is presented with a DC voltage, this voltage is simply passed through the rectifier (i.e. the DC voltage effectively treats the rectifier like a short-circuit, with only the diode only taking away a forward voltage).

During normal (when the AC mains is present) operation, the LED tube lamp is powered on by the alternating AC mains supply voltage, such as an AC mains $V_{AC}$ powered from a national/regional grid. This is shown by the dash line in FIG. 1. The monitoring circuit 191 identifies certain characteristics of this AC mains supply, which can trigger the start of a safety detection by the monitoring circuit. If the safety detection is carried out and passed, the LED tube lamp would draw power current from the AC mains and turn on the LEDs in the LED array.

Also shown in FIG. 1, the auxiliary arrangement 110 is configured to provide a DC supply voltage in the event of an absence, failure or disconnection of the alternating mains supply voltage, which DC supply voltage is for driving the LED tube lamp (e.g. in the event of a power cut or a tripped fuse (box)). This is called an emergency or back-up situation.

The auxiliary arrangement 110 comprises an input interface 111 and an output interface 112. The input interface 111 and the output interface 112 may each comprise a positive and negative terminal, as conventional in the art. The positive terminal may be configured to receive/provide a high voltage level and the negative terminal may configured to receive/provide a low voltage level—e.g. a voltage representing ground or earth.

The input interface 111 is configured to receive a DC voltage yin ("input DC voltage") generated by a DC voltage supply 140. The output interface 112 is adapted to provide a DC voltage $V_{DC}$ ("output DC voltage" or "DC supply voltage") for powering the LED tube lamp 190. Thus, the output interface may be configured to provide the DC supply voltage to the LED tube lamp.

The DC voltage supply 140 comprises a supply input interface 141 configured to receive energy from a backup energy storage 150, e.g. a battery or cell arrangement. The DC voltage supply may comprise electronic circuitry 145, e.g. comprising a conversion circuit adapted to convert energy from the backup energy storage to a DC voltage which is provided to the auxiliary arrangement—i.e. the input DC voltage $V_{in}$. This may be provided to the auxiliary arrangement via a supply output interface 142 and the input interface 111.

In some examples, the electronic circuitry 145 further comprises a supply AC status detection circuit (not shown) adapted to receive an indication of an absence, failure or disconnection of the alternating mains supply voltage for driving the LED tube lamp, wherein the DC-DC conversion circuit is configured to only convert the energy from the backup energy storage in response to the supply AC status detection circuit receiving an indication of an absence, failure or disconnection of the alternating mains supply voltage. For instance, the electronic circuitry 145 may receive the alternating mains supply voltage $V_{AC}$ as input, and be configured to identify when this alternating mains supply voltage $V_{AC}$ fails, is disconnected or is absent (e.g. by sensing when a magnitude of the RMS voltage level of the positive/negative part of the alternating mains supply voltage falls below some predetermined threshold).

The auxiliary arrangement 110 and the DC voltage supply 140 may together comprise a backup driver (which called also be called an "emergency driver"). The backup driver may further include the backup energy storage 150, such as a battery or cell arrangement.

Usually the backup DC supply voltage is input to the LED tube lamp via the same input interface of the LED tube lamp. This means that the LED tube lamp, after losing power due to the absence of AC mains, is re-powered on by the backup DC supply voltage and has to implement the safety detection again before it can turn on the LEDs in the LED array. But the backup DC supply voltage is not the AC mains and may not be able to provide the certain characteristics to trigger the monitoring circuit to start or perform the safety detection.

In order to solve this problem, the auxiliary arrangement 110 further comprises a modulation circuit 120. In the illustrated example, the modulation circuit 120 is connected between the input interface 111 and the output interface 112. The modulation circuit 120 is configured to modify the input DC voltage $V_{in}$, supplied to the input interface 111, to provide the DC voltage supply $V_{DC}$ (for driving the LED tube lamp) at the output interface 112. The modification includes modulating the input DC voltage $V_{in}$ according to one or more (e.g. predetermined) modulation patterns.

The one or more (predetermined) modulation patterns are configured to control the DC supply voltage to have at least one electrical characteristic substantially the same as the alternating mains supply voltage, to thereby produce the DC supply voltage.

It has previously been explained that the monitoring circuit 191 of an LED tube lamp is be configured to monitor for, in other words identify the occurrence of, certain (one or more) characteristics of a power supply provided to the LED tube lamp. These characteristics may be used to decide whether to begin a safety detection so as to subsequently/finally decide whether to permit power to flow to the rest of the LED tube lamp (i.e. to the downstream components of the LED tube lamp). In particular examples, it may not be possible to carry out the safety detection until these characteristics are identified. In some alternative examples, the identified characteristics are (further or otherwise) used to determine whether there is no human body present and the safety detection has been passed, meaning that the characteristics may be those that are only present in a connected AC mains supply if the AC mains supply has been correctly connected.

The below description will focus on embodiments in which these one or more characteristics are used to decide whether to begin/initiate a safety detection. In other embodiments, as previously explained, these characteristics can be used as triggers during the safety detection or be monitoring during the safety detection as part of the safety detection.

These one or more characteristics are typically those inherent in a conventional AC mains supply regardless of whether the human body is present or not, and may include near zero crossing, certain voltage levels, gradients of rising or falling edges of a supply voltage, periods of time between certain characteristics and so on.

The modulation circuit 120 is configured to modulate the input DC voltage (provided to the input interface 111) so that at least one electrical characteristics of the DC supply voltage $V_{DC}$ provided at the output interface 112 is similar or identical to the same at least one electrical characteristics of an AC mains supply. Thus, the DC supply voltage is able to mimic or simulate at least one electrical characteristic of an AC mains supply.

In this way, the modulation circuit modulates the DC voltage according to one or more (predetermined) modulation patterns. The said one or more (predetermined) modulation patterns are configured to control the DC supply voltage at the output interface to have at least one electrical characteristic substantially the same as the alternating mains supply voltage, to thereby produce the DC supply voltage.

The at least one electrical characteristic comprises one or more characteristics that, if detected by the monitoring circuit 191, would trigger a safety detection by the monitoring circuit 191. Put another way, the at least one electrical characteristic may be a pattern designed to be detected by a monitoring circuit of the LED tube lamp operating in a safety detection mode, to allow the monitoring circuit to carry out appropriate safety detection using the DC voltage provided at the output interface of the auxiliary arrangement.

In one example, the at least one electrical characteristic includes a falling voltage level that is lower than both the amplitude of the input DC voltage and lower than a predetermined voltage. Some monitoring circuits are configured to use a voltage level of a falling input voltage to be LED tube lamp below 30V as a trigger for a safety detection.

If there is no human, an input voltage (to the LED tube lamp) below 30V would mean that an (if the input was provided by a conventional alternating mains current supply) that this AC mains supply is near zero crossing, and the monitoring circuit can further verify this by detecting the falling gradient is high (e.g. exceeds or breaches some predetermined threshold). If there is a human, a falling input voltage below 30V occurs when the AC mains supply is still not near the zero crossing since the human body conducts a significant portion of the AC mains voltage, and the monitoring circuit can verify this by detecting the magnitude of the falling gradient is low. Thus, providing a voltage level lower than a threshold that continues to fall for a while allows this safety detection to take place and pass. If the nominal output voltage of the DC supply is 60V, the modulation is such that a voltage received by the monitoring circuit drops below 30V and keep falling for example to 20V.

In another example, the at least one electrical characteristic includes a falling or rising edge with a slope having a gradient with a magnitude greater than a predetermined value. In a sinusoidal AC mains, the time when the falling edge or rising edge is large is near the zero crossing thus the voltage is low and safe for performing a safety detection (i.e. for a test). Some monitoring circuits are configured to use a falling/rising edge as a trigger for a safety detection, and the safety detection is to detect an amplitude of current supplied by a voltage supply at that time of the falling/rising edge, which amplitude is higher than a threshold when there is no external human impedance connected in series to the input of the LED tube lamp and to the monitoring circuit, and is lower than a threshold when there is a (human) impedance connected. Thus, providing a suitable rising/falling edge by the DC supply voltage allows this safety detection to take place, which would not otherwise have occurred if the DC supply voltage was constant.

In this way, the modulation of the input DC voltage is able to create a DC supply voltage that mimics or simulates one or more characteristics of an AC mains supply, to initiate or provide a trigger for a safety detection by a monitoring circuit of the LED tube lamp.

The modulation of the input DC voltage may follow one or more predetermined patterns. In some examples, the modulation circuit is adapted to modulate the input DC voltage by performing two or more iterations of a modulation pattern in sequence. The modulation patterns may occur at a substantially same frequency at which the one or more electrical characteristics occur in the alternating mains supply voltage. This may be useful if the monitoring circuit of the LED tube lamp needs some time to reset itself before a next detection of the electrical characteristic, especially if the monitoring circuit is based on RC.

In some examples, the auxiliary arrangement further comprises a power detector configured to detect when an LED-driving power is drawn by the LED tube lamp. An LED-driving power is a power sufficient to drive the LED(s) of the LED tube lamp. If such a large power is detected, it means that the LED tube lamp has passed the safety detection and begins to emit light, meaning that modulation is no longer required.

One example of a power detector is a sensing resistor connected between the negative output terminal of the output interface and a ground or reference voltage. The voltage across this sensing resistor will be responsive to an amount of power drawn by a connected LED tube lamp.

As another example, a sensing resistor may be connected between the positive output terminal of the output interface and the modulation circuit (e.g. the terminal of the modulation circuit that provides the high level voltage). The voltage across this sensing resistor will also be responsive to an amount of power drawn by a connected LED tube lamp.

As another example, a power detector may comprise a current sensing device configured to detect a current flowing from the output interface (e.g. to the connected LED tube lamp), indicating that power is being drawn by the LED tube lamp.

In some examples, the modulation circuit may be configured to stop modulating the converted DC voltage in response to the power detector detecting that LED-driving power is being drawn by the LED tube lamp.

The LED-driving power may be a power drawn by the LED tube lamp that indicates that the LED tube lamp is outputting light (i.e. the LEDs are driven), e.g. rather than only auxiliary modules of the LED tube lamp (such as the monitoring circuit or the like) being powered.

Figure 4:
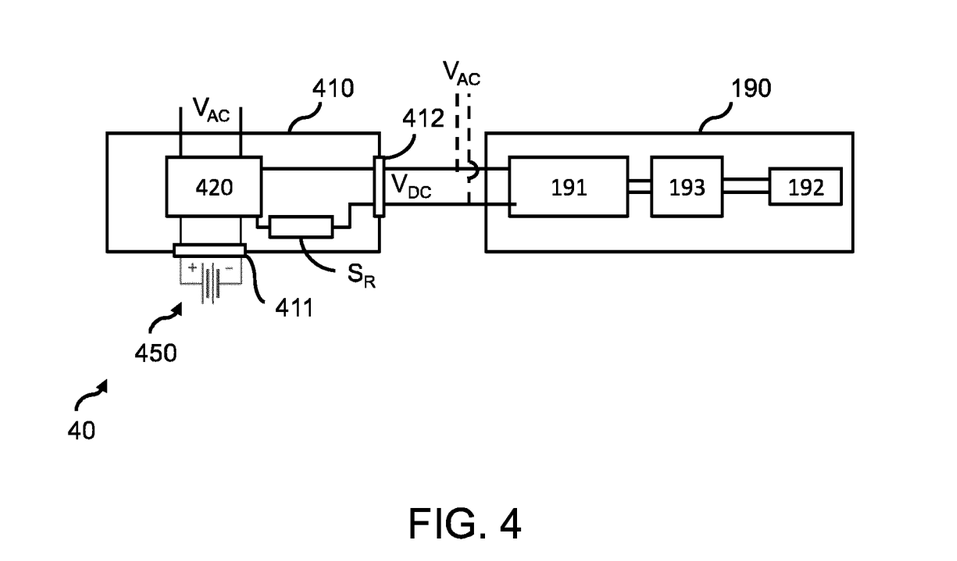
FIG. 4 illustrates another lighting unit having an auxiliary arrangement.

In some examples, the auxiliary arrangement may comprise a smoothing capacitor (not shown) configured to at least partially smooth the DC supply voltage. This capacitor may, for instance, be connected between the terminals of the output interface 412. The smoothing capacitor may also provide an advantage in the DC supply voltage (during modulation) to more closely resemble the alternating mains voltage supply. This increases a likelihood that the monitoring circuit of the LED tube lamp will be able to conduct the safety detection.

In other examples, this smoothing capacitor may be omitted, e.g. if it can be assumed that a connected LED tube lamp comprises a capacitor connected across its input terminals for performing a smoothing operation.

In some preferred examples, during a start-up procedure of the modulation circuit, the modulation circuit may stop or prevent modulation (e.g. according to the one or more modulation patterns) for a first period of time. This period of time may allow any components of the monitoring circuit of the LED tube lamp to build up charge or power up. It is possible that modulation of the DC supply voltage during this start-up period, if it is provided, would prevent sufficient charge from being built up for the monitoring circuit to operate correctly.

It is appreciated that the monitoring circuits of different LED tube lamps may require different electrical characteristics in a supply voltage for successfully carrying out (e.g. initiating or performing) a safety detection. For example, one LED tube lamp needs a low input voltage, and another LED tube lamp may need a rising edge with a high gradient.

In order to be compatible with different LED tube lamps, in some embodiments, the modulation circuit may be configured to perform a plurality of different modulation patterns. In other words, the modulation circuit may be configured to modulate the input DC supply according to a plurality of different modulation patterns. Each modulation pattern may control the DC supply voltage at the output interface to have a different set of electrical characteristics, in which the set of electrical characteristics includes at least one electrical characteristic substantially the same as the alternating mains supply voltage. The "at least one electrical characteristics" may differ for different modulation patterns.

Each set of electrical characteristics may include at least one electrical characteristic for which a monitoring circuit of an LED tube lamp is configured to detect (e.g. for acting as a trigger). The sets of electrical characteristics may be configured for different LED tube lamps (e.g. for meeting the requirements of the monitoring circuits of different LED tube lamps). Thus, each set of electrical characteristics may be associated with a different LED tube lamp, such that each modulation pattern is associated with a different LED tube lamp.

If the different electrical characteristics can be synthesized into one waveform/pattern, it would be better to provide this (single) pattern with the different electrical characteristics such that different LED tube lamp can all detect its own designed electrical characteristic via an output provided with a single type of modulation pattern.

In a further example, each modulation pattern may be repeated, e.g. no fewer than a predetermined number of times. Thus, the modulation circuit may perform a first modulation pattern for a first number of times, before performing a second, different modulation pattern for a second number of times and so on. In this way, the modulation circuit may perform X modulation patterns, each repeated by $N_X$ number of times (where $N_X$ may change for each modulation pattern).

This approach allows a single auxiliary arrangement to be configured for a plurality of different LED tube lamps.

Figure 2:
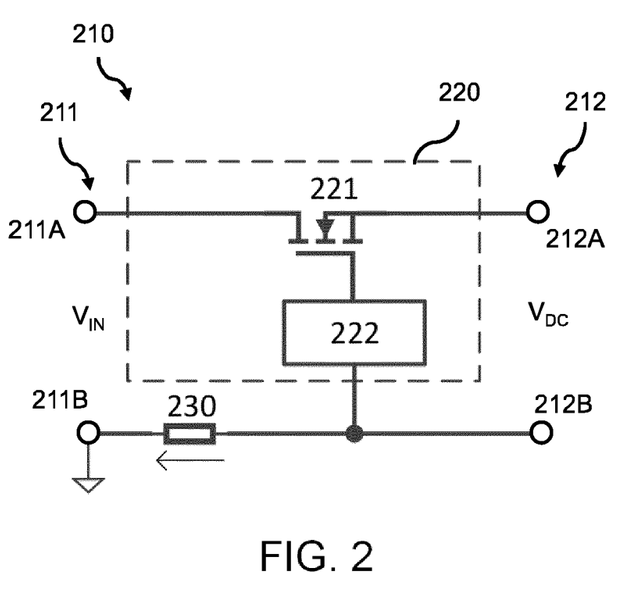
FIG. 2 illustrates an auxiliary arrangement.

FIG. 2 illustrates one example of a suitable auxiliary arrangement 210.

The auxiliary arrangement 210 comprises an input interface 211 and an output interface 212. The input interface comprises a first input terminal 211A and a second input terminal 211B, the voltage between the first and second input terminals 211A, 211B is the input DC voltage $V_{in}$. The second input terminal may, for instance, be connected to earth, or a ground/reference voltage level. The output interface comprises a first output terminal 212A and a second output terminal 212B, the voltage between the first and second output terminals 212A, 212B is the output DC voltage or DC voltage supply $V_{DC}$ (provided to the LED tube lamp).

The auxiliary arrangement 210 further comprises a modulation circuit 220 formed of a switch 221 and control circuitry 222.

The switch 221 is connected between the first input terminal 211A and the first output terminal 211B. The switch may, for instance, comprise a MOSFET, although other suitable switches are known. The operation of the switch 221 is controlled by the control circuitry. Thus, the control circuitry turning the switch 221 ON and OFF controls the modulation of the input DC voltage. The ON and OFF of the switch 221 makes a rising and falling edge in the DC supply voltage to the LED tube lamp, which edge may be detected by the monitoring circuit to start the safety detection. Alternative to the OFF state, the switch 221 can also enter a linear state which will also reduce the DC supply voltage to the LED tube lamp.

In some examples, the auxiliary arrangement 210 further comprises a sensing resistor 230, connected between the second output terminal 212B and the first output terminal 212A. A voltage across the sensing resistor 230 is responsive to whether or not power ("LED-driving power") is drawn by an LED tube lamp connected to the output interface.

The control circuitry 222 may be responsive to the voltage across the sensing resistor. In particular, the control circuitry 222 may be configured to stop the ON and OFF switching of switch 221 (or linear mode operation of the switch) in response to the voltage across the sensing resistor exceeding some predetermined threshold, and turn ON the switch 221 afterward to provide continuous power. The control circuitry 222 may receive a sensing signal from the second output terminal (have an input connected to the second output terminal), in order to sense the voltage across the sensing resistor 230.

In this way, the sensing resistor 230 acts as a power detector configured to detect when LED-driving power is drawn by the LED tube lamp. The modulation circuit is thereby configured to stop modulating the converted DC voltage in response to the power detector detecting that LED-driving power is being drawn by the LED tube lamp.

The LED-driving power may be a power drawn by the LED tube lamp that indicates that the LED tube lamp is outputting light (i.e. the LEDs are driven), e.g. rather than only auxiliary modules of the LED tube lamp (such as the monitoring circuit or the like) being powered. In the context of the auxiliary arrangement 210 illustrated by FIG. 2, this may be achieved through appropriate selection of the predetermined threshold for the voltage across the sensing resistor.

In some examples, the auxiliary arrangement may further comprise a DC-DC converter. The DC-DC converter is configured to modify a (maximum) voltage level of the DC supply voltage. This element may be omitted, e.g. if suitable conversion is performed by the DC voltage supply.

Figure 3:
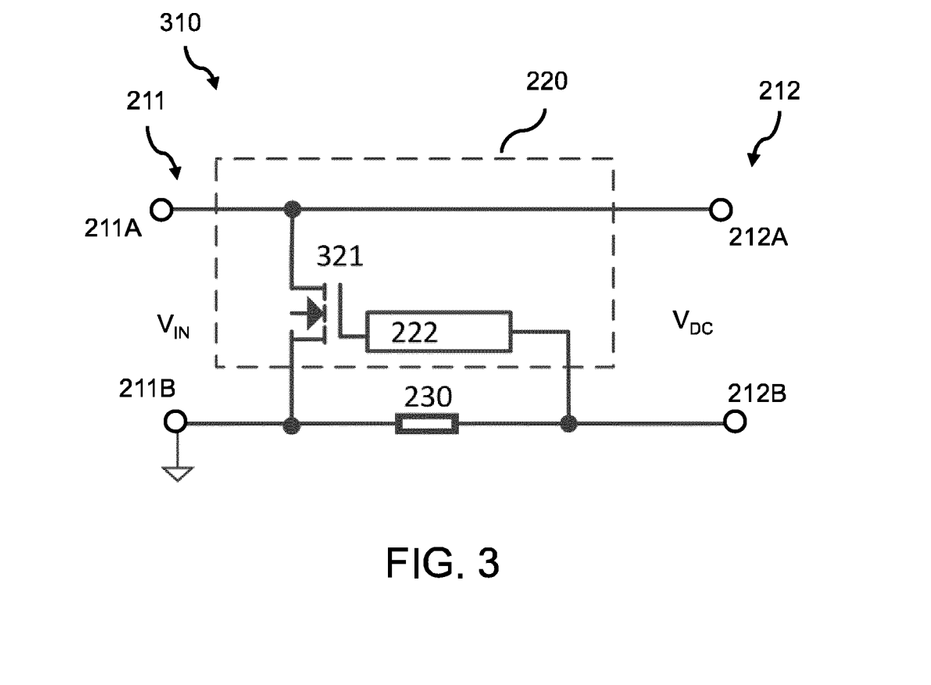
FIG. 3 illustrates another auxiliary arrangement.

FIG. 3 illustrates another example of a suitable auxiliary arrangement 310.

The auxiliary arrangement 310 differs from the auxiliary arrangement 210 (of FIG. 2) in that the switch 321 is connected between the first input terminal 211A and the second input terminal 211B, such that controlling the switch controls whether or not the input terminals are (effectively) short-circuited. The principle is similar with the above series switch 221. Note that the switch 321 can also work in linear region, instead of completely short circuit the input terminals. This would also generate a drop in the DC supply voltage to the LED tube lamp.

The first input terminal 211A is directly connected to the output terminal 212A (although this connection may be made via one or more other components, such as a resistor or the like).

This illustrated approach provides another mechanism for facilitating control over the voltage level between the output terminals. The operation of the auxiliary arrangement 310 may be otherwise similar or identical to the operation of the auxiliary arrangement 210 of FIG. 2.

In the preceding examples, described with reference to FIGS. 1 to 3, the modulation circuit is provided as part of a separate auxiliary arrangement 110 that is external to the DC voltage supply 140. However, in some examples, the auxiliary arrangement 110 may be integrated into the DC voltage supply, e.g. within the electronic circuitry 145 of the DC voltage supply. Thus, a DC voltage supply may be adapted to act as the auxiliary arrangement.

In this scenario, the conversion circuit of the DC voltage supply may act as the modulation circuit. In particular, the conversion circuit may be configured to adapt its operation to perform modulation of the DC voltage.

FIG. 4 illustrates an auxiliary arrangement 410 in which the auxiliary arrangement also performs some of the function of a DC voltage supply.

The auxiliary arrangement 410 comprises an input interface 411 and an output interface 412. The input interface is configured to obtain an input DC voltage, i.e. energy, directly from a backup energy storage 450, e.g. a cell or battery arrangement.

The auxiliary arrangement comprises a DC-DC converter 420 connected between the input interface 411 and the output interface 412 configured to modify a (maximum) voltage level of the input DC voltage. The DC-DC converter may comprise any suitable switched-mode power supply, such as a buck converter, a boost converter or a buck-boost converter. One suitable example of a DC-DC converter is a flyback converter, although other examples will be apparent to the skilled person.

In the illustrated example, the DC-DC converter 420 also acts as the modulation circuit for the auxiliary arrangement. In particular, the DC-DC converter 420 is configured to vary its conversion operation to modulate the DC voltage and add the at least one electrical characteristic to the DC supply voltage at the output interface of the auxiliary arrangement. This can be performed by selectively allowing current to flow from the input interface to the output interface (e.g. through appropriate operation of a switch included in the DC-DC converter). In one example, the reference output voltage can be adjusted in a low frequency so as to provide an output voltage pattern with the electrical characteristic.

Alternatively, the modulation of the DC-DC converter may be performed by the DC-DC converter operating in burst mode which will be discussed below by referring to FIG. 5.

The auxiliary arrangement also comprises a power detector configured to detect when an LED-driving power is drawn by the LED tube lamp. An LED-driving power is a power sufficient to drive the LED(s) of the LED tube lamp.

Here, the power detector comprises a sensing resistor SR connected between negative terminal of the output interface and a ground/reference voltage (not shown). The voltage across this sensing resistor SR will be responsive to an amount of power drawn by a connected LED tube lamp.

The DC-DC converter may be configured to stop modulating the input DC voltage responsive to the power detector indicating that an LED-driving power is present, e.g. if the voltage across the sensing resistor exceeds some predetermined threshold. The DC-DC converter may thereafter enter a conventional operation, e.g. to only convert a DC voltage without modulation and provide a constant DC voltage supply.

In some examples, the auxiliary circuit 410 further comprises a AC status detection circuit (not shown) adapted to receive an indication of an absence, failure or disconnection of the alternating mains supply voltage for driving the LED tube lamp, wherein the DC-DC converter 420 is configured to only convert the energy from the backup energy storage in response to the AC status detection circuit receiving an indication of an absence, failure or disconnection of the alternating mains supply voltage.

For instance, the DC-DC converter 420 may receive the alternating mains supply voltage $V_{AC}$ as input, and be configured to identify when this alternating mains supply voltage $V_{AC}$ fails, is disconnected or is absent (e.g. by sensing when a magnitude of the RMS voltage level of the positive/negative part of the alternating mains supply voltage falls below some predetermined threshold). Other approaches will be apparent to the skilled person.

The description provides various mechanisms for generating a modulated DC voltage, and proposes approaches for stopping modulation of the DC voltage responsive to the LED tube lamp beginning to draw power (for powering the LEDs thereof).

The modulated DC voltage provided to the LED tube lamp has one or more properties that mimic or are (substantially) identical to properties of the alternating mains supply voltage—i.e. the primary power source.

The precise properties of the modulation, i.e. the modulation control scheme, performed by the modulation circuit may depend upon the required electrical characteristics of a power supply required to start and/or pass a safety detection in the monitoring circuit of the LED tube lamp.

It has previously been explained that the monitoring circuit 191 of an LED tube lamp is configured to monitor for, and identify the occurrence, certain electrical characteristics of a power supply provided to the LED tube lamp to decide whether to begin a safety detection as to whether to permit power to flow to the rest of the LED tube lamp. In particular examples, it may not be possible to carry out the safety detection until these characteristics are identified.

In particular, an LED tube lamp may require some predetermined pattern in a received power supply in order for its monitoring circuit 191 to start/pass a predetermined safety detection, and allow the LED tube of the LED tube lamp to draw power.

These characteristics or patterns are typically inherent in a conventional AC mains supply that has been connected to the LED tube lamp. The characteristics or patterns may include predetermined voltage levels and/or voltage thresholds, gradients of rising or falling edges of a supply, periods of time between identifiable characteristics (e.g. between certain voltage levels) and so on.

In one example, a monitoring circuit of an LED tube lamp may require a falling edge having a gradient greater than some predetermined threshold in order to initiate a safety detection by the monitoring circuit. Appropriate modulation of the DC supply voltage will be able to provide a falling edge that meets this predetermined requirement.

In another example, a monitoring circuit of an LED tube lamp may require, for correctly performing a safety detection, a predetermined number of consecutive falling edges (e.g. spaced apart by some predetermined amount) having a gradient greater than some predetermined threshold. In other words, the monitoring circuit may require a series of triggers, where each trigger is a gradient having a falling edge greater than some predetermined threshold.

As yet another example, a monitoring circuit of an LED tube lamp may require (for performing a safety detection), in a voltage supply to the LED tube lamp, a sequence of voltage levels that fall below some predetermined threshold at some predetermined frequency (e.g. a frequency of a mains supply).

In another example, a monitoring circuit of an LED tube lamp may require (for performing a safety detection) a certain pattern in a particular electrical characteristic or group of electrical characteristics (e.g. a voltage level that drops below some threshold at a certain frequency over some predetermined time period, or a rising edge greater than some predetermined threshold occurring more than a predetermined number of times within a predetermined time period).

Of course, a combination of different electrical characteristics may be required. For instance, a certain safety detection may require a voltage supply to have a falling edge (e.g. greater than some predetermined gradient) at a voltage level below some predetermined threshold.

The above-provided examples are not exhaustive, and merely serve to demonstrate the wide variety of potential electrical characteristics of a voltage supply that can act as a trigger for a safety detection performed by a monitoring circuit. The present invention recognizes that appropriate modulation of a DC supply voltage can be used to simulate one or more of these electrical characteristics, e.g. by modulating the DC supply voltage according to one or more modulation patterns. Thus, modulation can provide the necessary triggers that allow the monitoring circuit to perform safety detection.

Figure 5:
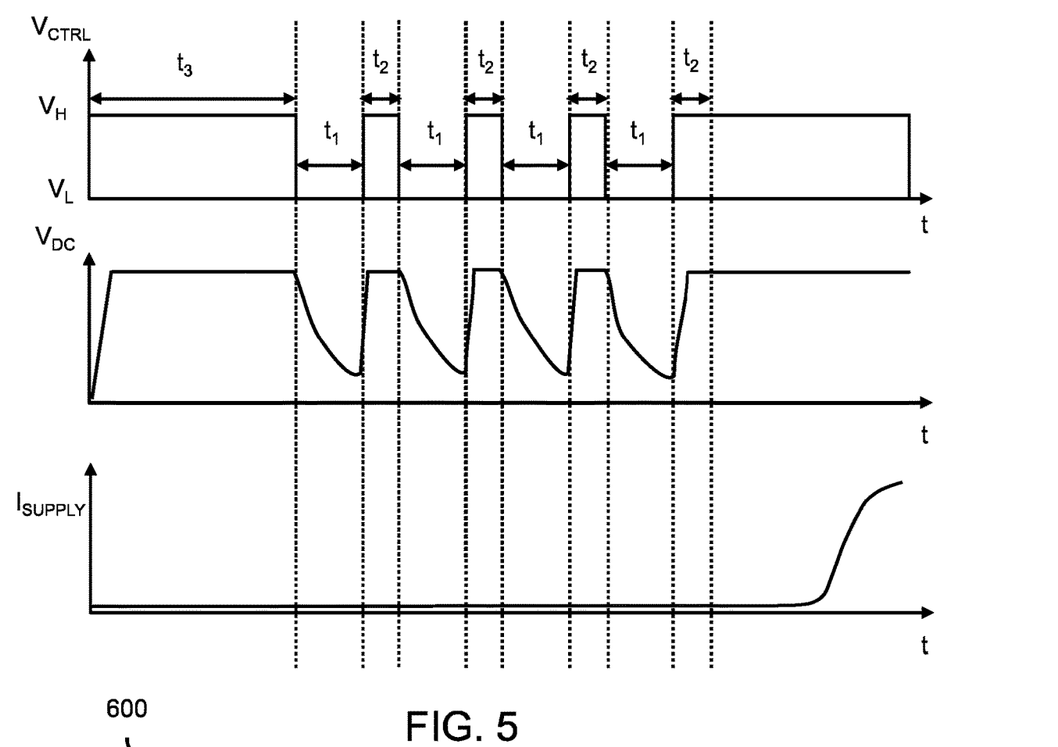
FIG. 5 illustrates a control scheme for an auxiliary arrangement.

FIG. 5 provides waveforms 510, 520, 530 illustrating one appropriate approach for controlling the modulation performed by the modulation circuit of an auxiliary arrangement.

These waveforms are described in the context of the auxiliary arrangement described in FIG. 4, but the principle can be adapted to the other forms of auxiliary arrangement described in this document. For the purposes of FIG. 5, it is assumed that the DC-DC converter comprises, at its output, a smoothing capacitor.

A first waveform 510 illustrates a control signal $V_{CTRL}$ for controlling the operation of the DC-DC converter. A second waveform 520 illustrates the DC supply voltage $V_{DC}$ provided by the auxiliary arrangement for the LED tube lamp. A third waveform 530 illustrates a current drawn by the LED tube lamp at its input arrangement.

For the control signal $V_{CTRL}$ that controls the operation of the DC-DC converter, a high level $V_H$ means the DC-DC converter is in operation (i.e. actively converting voltages) and a low voltage level $V_L$ means the DC-DC converter stops operation (i.e. stops converting voltage and prevents a current flow from the input interface to the output interface of the auxiliary device). Thus, the DC-DC converter is operated in a burst mode.

When the DC-DC converter is in operation, it outputs a regulated/(near-) constant voltage; when the DC-DC converter stops operation, the voltage at its output will drop. Due to that the LED tube lamp has not started (i.e. is not drawing significant current), the output capacitor of the DC-DC converter allows a relatively slow drop of the voltage at the output (which may be a result of a leakage current, a safety circuit (e.g. a high-impedance resistor connected between the capacitor and ground) or current being drawn by the monitoring circuit of the LED tube lamp). When the DC-DC converter is in operation again, the voltage at the output will be quickly pulled up to the constant voltage again. This effect of this control process is shown in the second waveform, illustrating the DC supply voltage $V_{DC}$.

In some examples, either the falling edge or the rising edge of the induced DC supply voltage $V_{DC}$ can be the electrical characteristic that triggers the monitoring circuit to start or perform the safety detection. The amplitude of the voltage may allow a test current to flow through, or test voltage be provided to, the monitoring circuit, which can be detected by the monitoring circuit as a metric of determining whether a correct connection has been made.

In the illustrated example, the modulation pattern comprises performing four repetitions of burst operations, each burst operation controlling the DC supply voltage to provide a falling voltage level for a first period of time $t_1$ before controlling the DC supply voltage to provide a rising edge and a high voltage level for a second period of time $t_2$. Thereafter, the four burst operations has already provided a trigger for four iterations of safety detections in the LED tube lamp, and the LED tube lamp passes the test and begins to draw substantial power current $I_{supply}$ from the DC supply voltage. The DC-DC converter is thereafter controlled to main the DC supply voltage at the high voltage level (i.e. the constant voltage level).

The first period of time $t_1$ and second period of time $t_2$ are selected so that the DC supply voltage mimics at least one electrical characteristic of the alternating mains supply voltage.

Although only one iteration of the four modulation patterns is illustrated, the iteration may be repeated. In some examples, the iteration is repeated a predetermined number of times. In other examples, the modulation pattern is repeated until a power detector detects an LED-driving power being drawn by the LED tube lamp. Alternatively, the backup driver may stop this modulation after some predetermined time period has elapsed.

Although only a single type of modulation pattern is illustrated, the modulation circuit may be configured to perform a plurality of different types of modulation pattern, e.g. a predetermined number of times and/or until a power detector detects an LED-driving power being drawn by the LED tube lamp.

In the illustrated example, the modulation pattern is only performed after an initial time period $t_3$ has elapsed from a start-up of the modulation circuit. This initial time period $t_3$ should be set to an appropriate value to allow enough time to ensure components of the monitoring circuit (of the LED tube lamp) are able to charge. Preferably, the initial time period $t_3$ should also be set to not be so long as to heavily impact start-up time of the system.

A suitable length for the initial time period is no greater than 100 ms, e.g. no greater than 50 ms.

Figure 6:
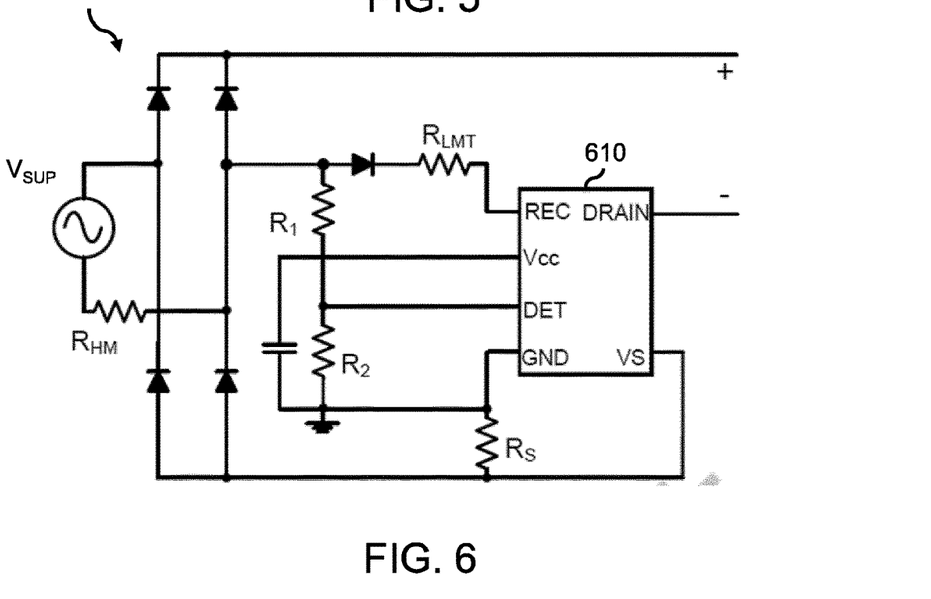
FIG. 6 illustrates a monitoring circuit for a LED tube lamp.

For improved contextual understanding, FIG. 6 illustrates a known circuit for the safety detection, including a monitoring circuit 600 in an exemplary LED tube lamp. The monitoring circuit is connected between the voltage supply $V_{SUP}$ and a potential human body shown as a resistor $R_{HM}$. The voltage supply $V_{SUP}$ is usually an alternating mains supply voltage, but (if adopting the approach of the present disclosure) may be the DC supply voltage.

The monitoring circuit controls whether or not a current is allowed to flow between two terminals $V_+$ and $V_-$ via the downstream components or the downstream circuit connected between these two terminals.

The monitoring circuit 600 comprises a control circuit 610 (e.g. an integrated circuit). The control circuit 610 controls whether power is allowed to flow to the downstream circuit of the LED tube lamp, e.g. by selectively connecting or disconnecting a drain terminal DRAIN (of the control circuit 610), which is connected to V−, to a ground terminal GND (which is in turn connected to earth, a ground or a reference voltage). This selective connection is performed via an internal MOSFET (not shown) whose drain is connected to the terminal DRAIN and source is connected to the ground terminal GND, or vice versa. The ground terminal GND is also connected back to the voltage supply $V_{SUP}$ to thereby allow (when the internal MOSFET is closed) current to flow through the downstream circuit and back to the voltage supply $V_{SUP}$ via the drain terminal DRAIN and the ground terminal GND.

Thus, in this illustrated example, a disconnection of the drain terminal DRAIN from the ground terminal GND (via the internal MOSFET) results in current being prevented from flowing through the downstream circuit (as there is no drain for the current). On the contrary, a connection of the terminal DRAIN to the ground terminal GND (via the internal MOSFET) results in current flowing through the downstream circuit.

The downstream circuit includes the LED driver and the LEDs in the LED array.

The control circuit 610 monitors characteristics of the voltage supply $V_{SUP}$, and uses these characteristics to decide when to allow power to flow to other components of the LED tube lamp, i.e. when to connect or disconnect the drain terminal DRAIN to the ground terminal GND. In particular, the control circuit may perform a safety detection to decide whether or not to allow this current flow.

The illustrated monitoring circuit is configured to perform a safety detection by carrying out the following process.

The control circuit monitors the voltage supply $V_{SUP}$ at the terminal DET via the voltage divider R1 and R2. By analyzing the waveform or dv/dt of the voltage at the terminal DET, the control circuit can know when this voltage supply is near a zero crossing, as previously explained. In other words, one or more electrical characteristics of the voltage supply $V_{SUP}$ is used as a trigger (e.g. when near a zero crossing).

The control circuit connects a large resistor $R_{LMT}$ (connected to a rec terminal REC) in series with the potential human body $R_{HM}$, a sense resistor $R_S$ and the voltage supply $V_{SUP}$. Around the zero crossing point (e.g. when the trigger is received), the control circuit allows current to flow, for a pulse or time period of a predetermined width/length, from the REC terminal to the ground terminal GND. For the duration of this pulse, a test circuit is therefore completed, comprising the large resistor $R_{LMT}$, the potential human body $R_{HM}$, the sense resistor $R_S$ and the voltage supply $V_{SUP}$ (as well as one or more diodes, e.g. of the bridge rectifier).

The completion of this test circuit causes a test current to flow through these components. The large resistor $R_{LMT}$ is used to ensure that this test current is sufficiently low and safe for the human, and should therefore an appropriate resistance.

The control circuit 610 monitors this test current, e.g. by monitoring a voltage across the sensing resistor $R_S$, e.g. using a sense terminal VS (a difference between the voltage at the sense terminal VS and the ground terminal GND being the voltage across the sensing resistor). If this voltage is larger than some predetermined voltage level (e.g. 1V) during the pulse of the predetermined width, this indicates that the test current is large, indicating that there is no large human impedance and therefore no human. This check may be repeated (e.g. 3 times) for improved reliability. After that, the control circuit will connect the downstream circuit as mentioned above (e.g. by connecting the drain terminal DRAIN to the ground terminal GND). Otherwise, if the voltage is small, meaning the test current is small due to that there is a potential human body impedance $R_{HM}$, the LED tube lamp cannot start (as the drain terminal DRAIN is not connected to the ground terminal GND).

To satisfy this monitoring circuit, a suitable modulation pattern would provide a voltage supply that has a drop in the voltage to start the safety detection and to maintain the voltage above a certain level to provide a large test current. The voltage pattern as shown in FIG. 5 may be suitable.

Please note this is only an example of the trigger for the safety detection (electronic characteristics) and the metric of the safety detection. There are other start criteria and metrics, and those skilled in the art can use the idea of modulating the DC voltage to meet the other start criteria and metric. Also please note that the detailed start criteria and metric of the safety detection is not designed by the present disclosure, and the essence of this disclosure is the principle of modulating the DC voltage to have such start criteria to start the safety detection, and optionally ensure the metric of the safety detection is also provided by the modulated DC voltage.

Optionally, the control circuit will also check a time interval between the voltage supply $V_{SUP}$'s zero crossings. The time interval should correspond to a period (the reciprocal of the frequency) of an alternating mains supply voltage, e.g. no less than 6 ms or (if directly connecting a mains supply) no less than a period (the reciprocal of the frequency) of the mains supply.

If the above conditions are met, the control circuit detects a low input impedance and allows the other components of the LED tube lamp to draw power, e.g. switch on the LED tube. Otherwise the control circuit will prevent the other components of the LED tube lamp from drawing power.

The above process provides an example of a suitable safety detection. The control circuit may repeatedly perform the safety detection until the condition(s) of the safety detection is satisfied. Alternatively, there is a maximum time for safety detection and the monitoring circuit will lock down without further detection after the maximum time. Only a reset/re-powering of the monitoring circuit would make it test again.

Once the conditions of the safety detection are satisfied, the control circuit may permit the remainder of the LED tube lamp to draw power until the power supply is disconnected or fails, e.g. a power recycle occurs. This can be detected by monitoring a voltage level provided by the voltage supply, e.g. via a voltage divider $R_1$, $R_2$.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". Any reference signs in the claims should not be construed as limiting the scope.

The invention claimed is:

1. An auxiliary arrangement for providing a DC supply voltage for driving an LED tube lamp in the absence, failure or disconnection of an alternating mains supply voltage for driving the LED tube lamp, said auxiliary arrangement comprising:
   an input interface configured to receive, from a DC voltage supply, an input DC voltage generated by the DC voltage supply in the absence, failure or disconnection of the alternating mains supply;
   an output interface for connecting to the LED tube lamp and for providing the DC supply voltage to the connected LED tube lamp;
   characterized in that the auxiliary arrangement comprises:
   a modulation circuit connected between the input interface and the output interface, the modulation circuit being configured to modulate the input DC voltage according to one or more modulation patterns, wherein said one or more modulation patterns are configured to control the DC supply voltage at the output interface to have at least one electrical characteristic the same as the alternating mains supply voltage, to thereby produce the DC supply voltage.

2. The auxiliary arrangement of claim 1, wherein the at least one electrical characteristic comprises one or more electrical characteristics configured to be detected by a monitoring circuit of the LED tube lamp operating in a safety detection mode, to allow the monitoring circuit to start a safety detection using the DC supply voltage.

3. The auxiliary arrangement of claim 1, wherein said at least one electrical characteristic comprises at least one of:
   a voltage lower than both the amplitude of the input DC voltage and lower than a predetermined voltage; and/or
   a falling or rising edge with a slope having a gradient with a magnitude greater than a predetermined value.

4. The auxiliary arrangement of claim 1, wherein the modulation circuit is adapted to modulate the input DC voltage with a sequence of two or more iterations of the one or more modulation patterns, optionally the modulation patterns occur at a substantially same frequency at which the electrical characteristic occurs in the alternating mains supply voltage.

5. The auxiliary arrangement of claim 1, wherein the modulation circuit is adapted to sequentially perform one or more iterations of a first modulation pattern that provides a DC supply voltage having an electrical characteristic; and one or more iterations of a second, different modulation pattern that provides a DC supply voltage having another electrical characteristic different from that of the first modulation pattern.

6. The auxiliary arrangement of claim 1, further comprising a power detector configured to detect when LED-driving power is drawn by the LED tube lamp, and
   wherein the modulation circuit is configured to stop modulating the input DC voltage in response to the power detector detecting that LED-driving power is being drawn by the LED tube lamp.

7. The auxiliary arrangement of claim 1, wherein the modulation circuit comprises a switch, in series or in parallel with the input interface or the output interface.

8. The auxiliary arrangement of claim 1, wherein the modulation circuit comprises a current control circuit, in a condition of the DC supply voltage, to provide an input current to be detected by the monitoring circuit to pass the safety detection using the input current, after the safety detection of the monitoring circuit has started.

9. The auxiliary arrangement of claim 1, wherein the auxiliary arrangement is adapted to be connected between a DC-DC converter and the LED tube lamp.

10. The auxiliary arrangement of claim 1, wherein the auxiliary arrangement comprises a DC-DC converter configured to modify a voltage level of the input DC voltage.

11. The auxiliary arrangement of claim 10, wherein:
    the modulation circuit comprises the DC-DC converter, wherein the DC-DC converter is configured to vary its conversion operation to modulate the input DC voltage and add the at least one electrical characteristic to the DC supply voltage at the output interface of the auxiliary arrangement.

12. The auxiliary arrangement of claim 11, wherein the DC-DC converter is adapted to work in a burst mode to vary the input DC voltage so as to create the at least one electrical characteristic in the DC supply voltage.

13. The auxiliary arrangement of claim 10, further comprising an AC status detection circuit adapted to receive an indication of an absence, failure or disconnection of the alternating mains supply voltage for driving the LED tube lamp,
    wherein the DC-DC converter is configured to only convert the input DC voltage in response to the AC status detection circuit receiving an indication of an absence, failure or disconnection of the alternating mains supply voltage.

14. A backup driver comprising:
    the auxiliary arrangement of claim 1:
       the DC voltage supply comprising:
          a supply input interface adapted to be connected to a backup energy storage; and
          a DC-DC conversion circuit adapted to convert energy from the backup energy storage, received at the driver input interface, to generate the DC voltage for the auxiliary arrangement.

15. The backup driver of claim 14, further comprising a supply AC status detection circuit adapted to receive an indication of an absence, failure or disconnection of the alternating mains supply voltage for driving the LED tube lamp,
    wherein the DC-DC conversion circuit is configured to only convert the energy from the backup energy storage in response to the supply AC status detection circuit receiving an indication of an absence, failure or disconnection of the alternating mains supply voltage.

* * * * *